ized October 25, 1932

UNITED STATES PATENT OFFICE

EDMUND O. RHODES AND FLOYD D. HAGER, OF PITTSBURGH, PENNSYLVANIA, ASSIGNORS TO AMERICAN TAR PRODUCTS COMPANY, A CORPORATION OF DELAWARE

COMPOSITION OF MATTER AND PROCESS OF PREPARING THE SAME

No Drawing.   Application filed July 20, 1929. Serial No. 379,878.

This invention relates to a composition of matter and a process of preparing the same and more particularly to the preparation of plastic compositions containing bituminous materials.

It is known that rubber may readily be dissolved or dispersed in petroleum products and particularly in tars derived from petroleum or in products obtained by the distillation thereof. However, coal tar has been found to be a very poor solvent or dispersing agent for rubber.

An object of this invention is to combine the properties of bituminous materials and rubber and to form a product which will be exceedingly useful in the various arts.

The product of this invention comprises various combinations of bituminous materials and a rubber ingredient such as vulcanized or unvulcanized rubber, latex, gutta-percha, balata and other caoutchouc-like materials, treated with sulphur. The particular bituminous materials which are used are petroleum tar such as water gas tar; coal tar such as coke oven tar; and the distillates and pitches obtained from such tars. When a coke oven tar is used it is desirable, but not necessary however, to employ one from which substantially all constituents boiling above 190° C. have been removed.

A very useful product is formed by mixing rubber with water gas tar until a homogeneous mass is obtained and then adding sulphur and heating until a product of the desired viscosity, elasticity and toughness is obtained. This may be determined by testing cooled samples of the heated materials.

Another desirable product is obtained by including in the above composition a coal tar such as coke oven tar. Pitch derived from water gas tar or coal tar may be substituted for a part of or all of the coal tar. When these materials are included, it is preferred to first disperse rubber in water gas tar, then mix in the coal tar and/or pitch and finally treat with sulphur. If the tars are first treated with sulphur before the addition of rubber, the resulting product is not as likely to have as desirable properties as those of the product obtained in the preferred method.

The rubber, water gas tar and coal tar and/or pitch are heated and stirred together until a homogeneous mass is obtained and sulphur is then added to the extent of 4 to 15% of the weight of bituminous materials with thorough mixing. The reaction mixture is heated until it is found that cooled samples thereof will remain homogeneous and have the desired degree of elasticity and toughness, the magnitude of which will of course vary with the quality and quantities of the materials used.

By way of example, the following method may be employed in the preparation of a product of this invention: 15 parts by weight of a vulcanized rubber are dissolved or dispersed in 100 parts by weight of water gas tar. 200 parts by weight of this mixture are added to 800 parts by weight of coke oven tar. The mixture is heated to about 130° C. with stirring and 40 parts by weight of finely divided sulphur are added over a period of about 15 minutes. The temperature of the reaction mixture is then raised to about 150° C. for one hour, the stirring being continued throughout that time.

Upon treatment of the tar and rubber with sulphur, the latter brings about changes which result in the formation of a permanent solution or dispersion of the rubber. The resulting product is elastic and tough and quite unlike any of the original materials.

By the process of this invention products are prepared which have a high degree of elasticity and low thermo susceptibility and are very useful in the manufacture of materials in which bituminous matter is employed, as for instance in insulating and road materials.

We claim as our invention:

A process comprising dissolving a rubber ingredient is water gas tar, mixing coke oven tar with the resulting solution, heating the mixture to about 130° C., adding sulphur to the said mixture with stirring, raising the temperature to and keeping it at about 150° C. until the mixture, when cooled, remains homogeneous.

In testimony whereof, we have hereunto subscribed our names this 16th day of July, 1929.

EDMUND O. RHODES.
FLOYD D. HAGER.